(12) United States Patent
Harp et al.

(10) Patent No.: US 7,289,568 B2
(45) Date of Patent: Oct. 30, 2007

(54) SPECTRUM MANAGEMENT APPARATUS, METHOD, AND SYSTEM

(75) Inventors: Jeffrey C. Harp, Los Altos, CA (US); Ernest T. Tsui, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 763 days.

(21) Appl. No.: 10/716,758

(22) Filed: Nov. 19, 2003

(65) Prior Publication Data

US 2005/0105635 A1 May 19, 2005

(51) Int. Cl.
*H04L 5/12* (2006.01)
(52) U.S. Cl. ............... 375/263; 375/232; 375/298; 375/346
(58) Field of Classification Search ........... 375/229, 375/232, 260, 263, 296, 298, 346
See application file for complete search history.

(56) References Cited

U.S. PATENT DOCUMENTS

| | | | |
|---|---|---|---|
| 6,130,894 A | | 10/2000 | Ojard et al. |
| 6,208,663 B1 * | | 3/2001 | Schramm et al. ........... 370/465 |
| 6,285,718 B1 | | 9/2001 | Reuven |
| 6,522,699 B1 * | | 2/2003 | Anderson et al. ........... 375/295 |
| 6,625,235 B1 * | | 9/2003 | Coker et al. ................ 375/341 |
| 7,116,958 B1 * | | 10/2006 | Brown et al. ............... 455/266 |
| 2002/0126778 A1 * | | 9/2002 | Ojard et al. |
| 2003/0142759 A1 | | 7/2003 | Anderson et al. |

FOREIGN PATENT DOCUMENTS

| WO | WO-0154368 A1 | 7/2001 |
|---|---|---|
| WO | WO-2005053257 A2 | 6/2005 |

OTHER PUBLICATIONS

Kadambi, J., et al., "A Bandwidth-Efficient Encoding Scheme for High-Speed Data Transmission on Category 3 Cable", *Proceedings of 17th Conference on Local Computer Networks, 1992*, IEEE Computer Society, US,(Sep. 13,1992), 152-156.
International Search Report and Written Opinion of the International Searching Authority; Dated Jul. 20, 2005; PCT/US2004/037673, 29 pages.

* cited by examiner

*Primary Examiner*—Dac V. Ha
(74) *Attorney, Agent, or Firm*—LeMoine Patent Services, PLLC; Dana B. LeMoine

(57) ABSTRACT

A reconfigurable partial response encoder manages the emitted spectrum of a digital signal.

25 Claims, 10 Drawing Sheets

SPECTRUM MANAGEMENT APPARATUS, METHOD, AND SYSTEM

FIELD

The present invention relates generally to electronic circuits, and more specifically to digital circuits that emit electromagnetic radiation.

BACKGROUND

Digital circuits that transmit digital data may also emit electromagnetic radiation. Electromagnetic radiation in various parts of the frequency spectrum may cause interference to other circuits or systems.

DESCRIPTION OF EMBODIMENTS

Figure 1:
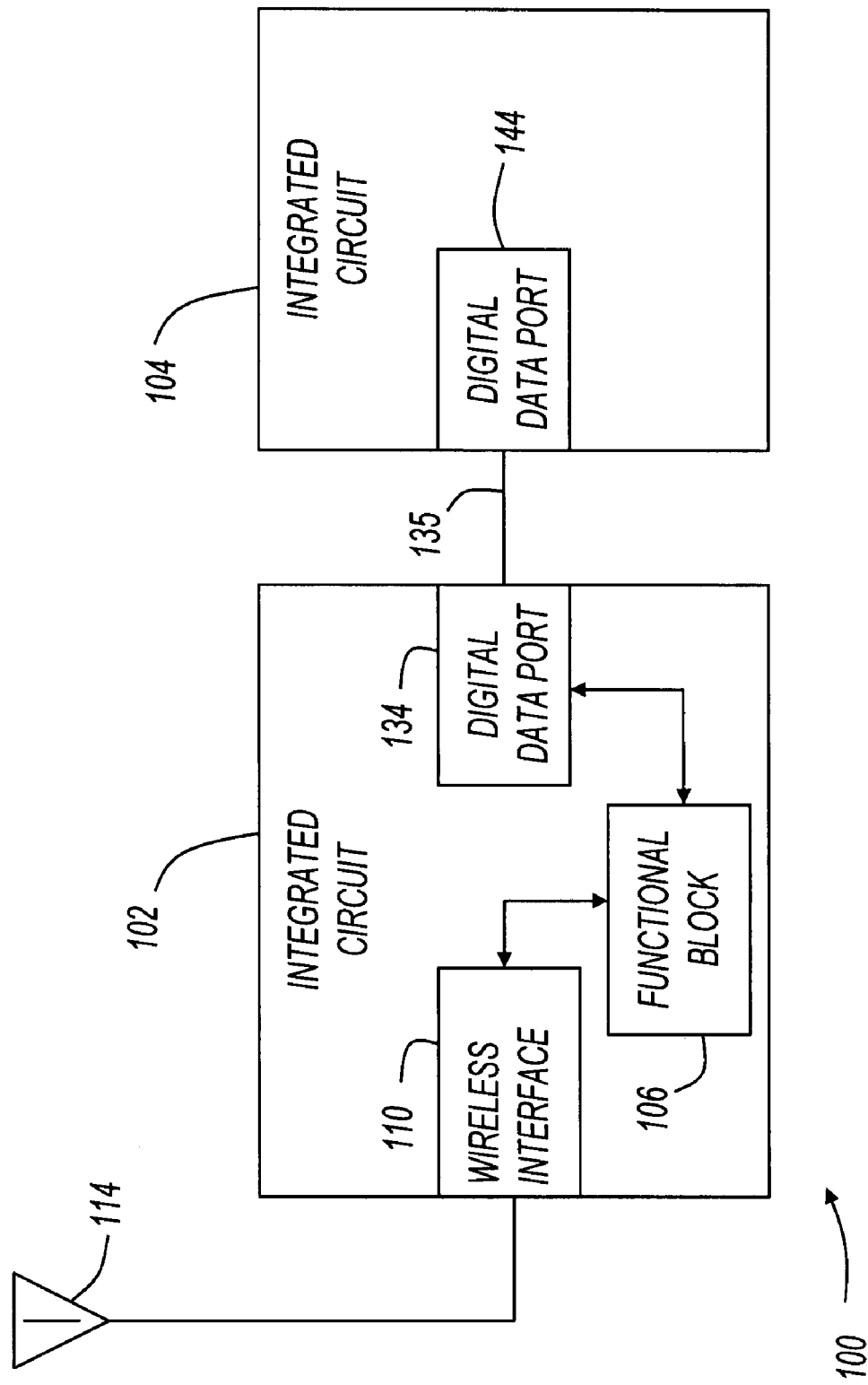
FIG. 1 shows a block diagram of an electronic system.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a block diagram of an electronic system. System 100 includes integrated circuits 102 and 104, and antenna 114. Integrated circuit 102 includes wireless interface 110, functional block 106, and digital data port 134; and integrated circuit 104 is shown including digital data port 144. Antenna 114 may be a directional antenna or an omni-directional antenna. As used herein, the term omni-directional antenna refers to any antenna having a substantially uniform pattern in at least one plane. For example, in some embodiments, antenna 114 may be an omni-directional antenna such as a dipole antenna, or a quarter-wave antenna.

Also for example, in some embodiments, antenna 114 may be a directional antenna such as a parabolic dish antenna or a Yagi antenna.

In operation, system 100 may include the ability to communicate using digital signals and radio frequency (RF) signals. For example, wireless interface 110 is coupled to antenna 114 to transmit and receive RF signals at various frequencies. Also for example, digital data ports 134 and 144 are coupled by conductor 135 to communicate using digital signals.

In some embodiments, RF signals transmitted or received by antenna 114 may correspond to voice signals, data signals, or any combination thereof. For example, wireless interface 110 may be a wireless local area network (WLAN) interface, cellular phone interface, global positioning system (GPS) interface, or the like.

In some embodiments, digital data ports 134 and 144 communicate using digital signals transmitted at various frequencies, and over varying distances. For example, digital data ports 134 and 144 may communicate at symbol rates or data rates of a few megahertz (MHz), a few hundred MHz, a few gigahertz (GHz), any rate in between, or any rate higher. Further, integrated circuits 102 and 104 may be closely spaced and conductor 135 may be short, or integrated circuits 102 and 104 may be spaced far apart and conductor 135 may be long.

Integrated circuit 102 also includes functional block 106. Functional block 106 represents any portion of integrated circuit 102 that communicates with wireless interface 110 and digital data port 134. For example, in some embodiments, integrated circuit 102 includes wireless interfaces, digital data ports, and a processor. In these embodiments, functional block 106 may represent a portion of a processor, or a complete processor. Also for example, in some embodiments, integrated circuit 102 may include wireless interfaces, digital data ports, and hardware dedicated to a particular task. In these embodiments, functional block 106 may include data path components such as amplifiers, analog-to-digital converters, registers, adders, and multipliers, or may include control components such as state machines or the like. Integrated circuit 102 may include many wireless interfaces 110, many digital data ports 134, and many functional blocks 106. Further, in some embodiments, integrated circuit 102 may include many circuit types other than those shown in FIG. 1.

Integrated circuit 104 is shown including digital data port 144. In some embodiments, integrated circuit 104 includes more than one digital data port. For example, in some embodiments, each of integrated circuits 102 and 104 include multiple digital data ports coupled by conductors 135. Further, integrated circuit 104 may include functional blocks, wireless interfaces, or any other suitable circuit.

Digital signals transmitted by digital data ports 134 and 144 may emit electromagnetic radiation that exhibit a transmitted power spectrum that could potentially cause interference to wireless signals. For example, digital signals having a symbol rate of 2.5 gigasamples/second (GS/s) may produce radio frequency (RF) energy in a broad range of frequencies, including at 800-900 MHz and at 2.4 GHz, which may be wireless frequency bands used by wireless interface 110 or other wireless interfaces in system 100. The above-mentioned operating rates and wireless frequency bands are listed as examples only. This discussion is not intended to limit the operation of digital data ports or wireless interfaces in system 100 to the operating rates or frequency bands listed as examples. Other possible frequency bands in use by system 100 may include 1.5 GHz for GPS signals, 5-6 GHz for wireless local area network signals, or any other useful RF frequency band. Further, system 100 may include multiple wireless interfaces, operating in various wireless frequency bands.

In some embodiments, digital data ports 134 and 144 include circuits to reduce potential interference by managing the transmitted spectrum of digital signals on conductor 135. For example, digital data port 134 may include pulse shaping, waveform coding, filtering, variable clock rates, variable data rates, or the like, to suppress RF energy in frequency bands of interest. Various embodiments of digital data ports are shown in, and described with reference to, the following figures.

Figure 2:
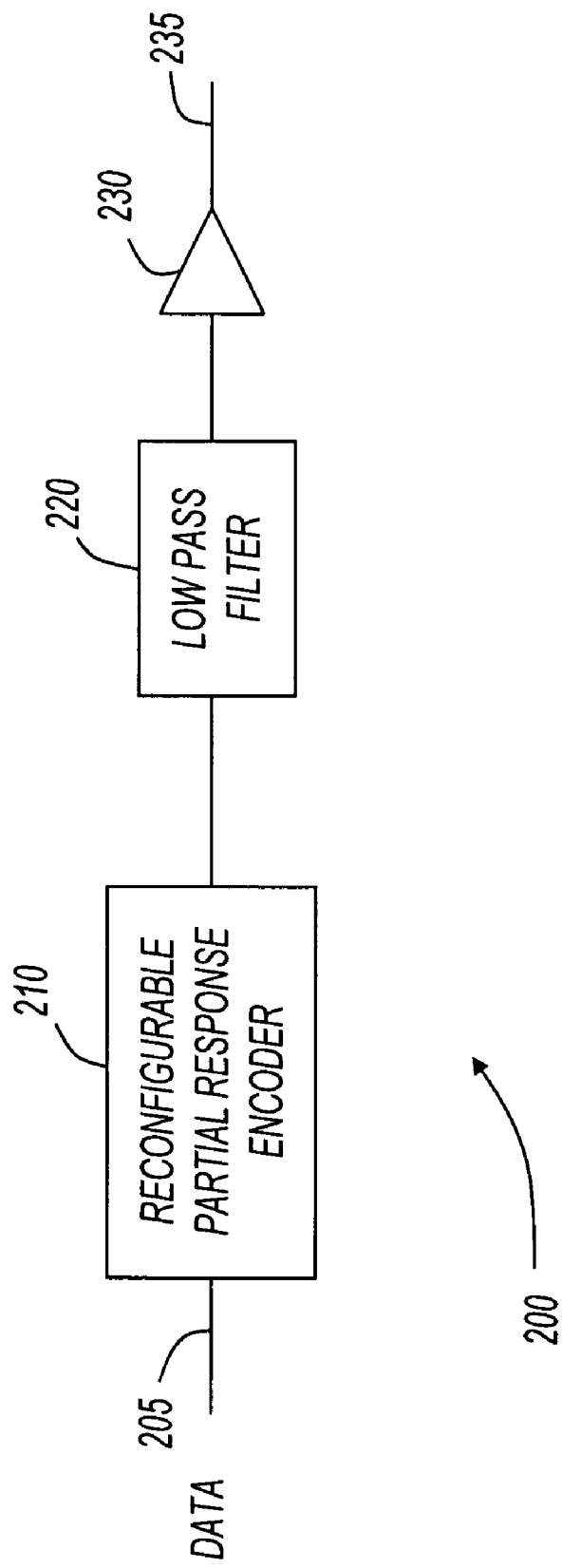
FIG. 2 shows a diagram of a digital data port.

FIG. 2 shows a block diagram of a digital data port. Digital data port 200 includes reconfigurable partial response encoder 210, low pass filter 220, and line driver 230. For simplicity, FIG. 2 only shows the transmitting portion of a digital data port. In some embodiments, digital data port 200 includes a receiving portion as well as a transmitting portion. Digital data port 200 may be used as a digital data port in an electronic system, such as digital data port 134 in system 100 (FIG. 1).

Reconfigurable partial response encoder 210 reshapes the spectrum of the data received on node 205. Data received on node 205 may correspond to data received from a functional block in a system such as functional block 106 in system 100 (FIG. 1). The spectrally reshaped data from reconfigurable partial response encoder 210 is passed through low pass filter 220, and is driven on conductor 235 by line driver 230. Conductor 235 may correspond to a conductor in a system, such as conductor 135 in system 100 (FIG. 1).

Reconfigurable partial response encoder 210 may produce one or more "notches" in the transmitted spectrum of digital signals driven onto conductor 235. For example, in some embodiments, a spectral notch may be produced in a wireless frequency band used by one or more wireless interfaces. In other embodiments, a spectral notch may be produced in the region of a wireless frequency band used by one or more wireless interfaces, or may be produced in a frequency band other than a frequency band used by one or more wireless interfaces. In some embodiments, reconfigurable partial response encoder 210 is used to reshape the emitted spectrum to reduce interference to wireless interfaces, or other wireless devices.

In some embodiments, reconfigurable partial response encoder 210 may be configurable to create spectral notches in various frequency bands. For example, in some embodiments, reconfigurable partial response encoder 210 may be preset before operation to create a spectral notch in a specific frequency range. Also in some embodiments, reconfigurable partial response encoder 210 may be reconfigured during operation to move the spectral location of a spectral notch. Various embodiments of reconfigurable partial response encoders are described below with reference to FIG. 3.

Figure 3:
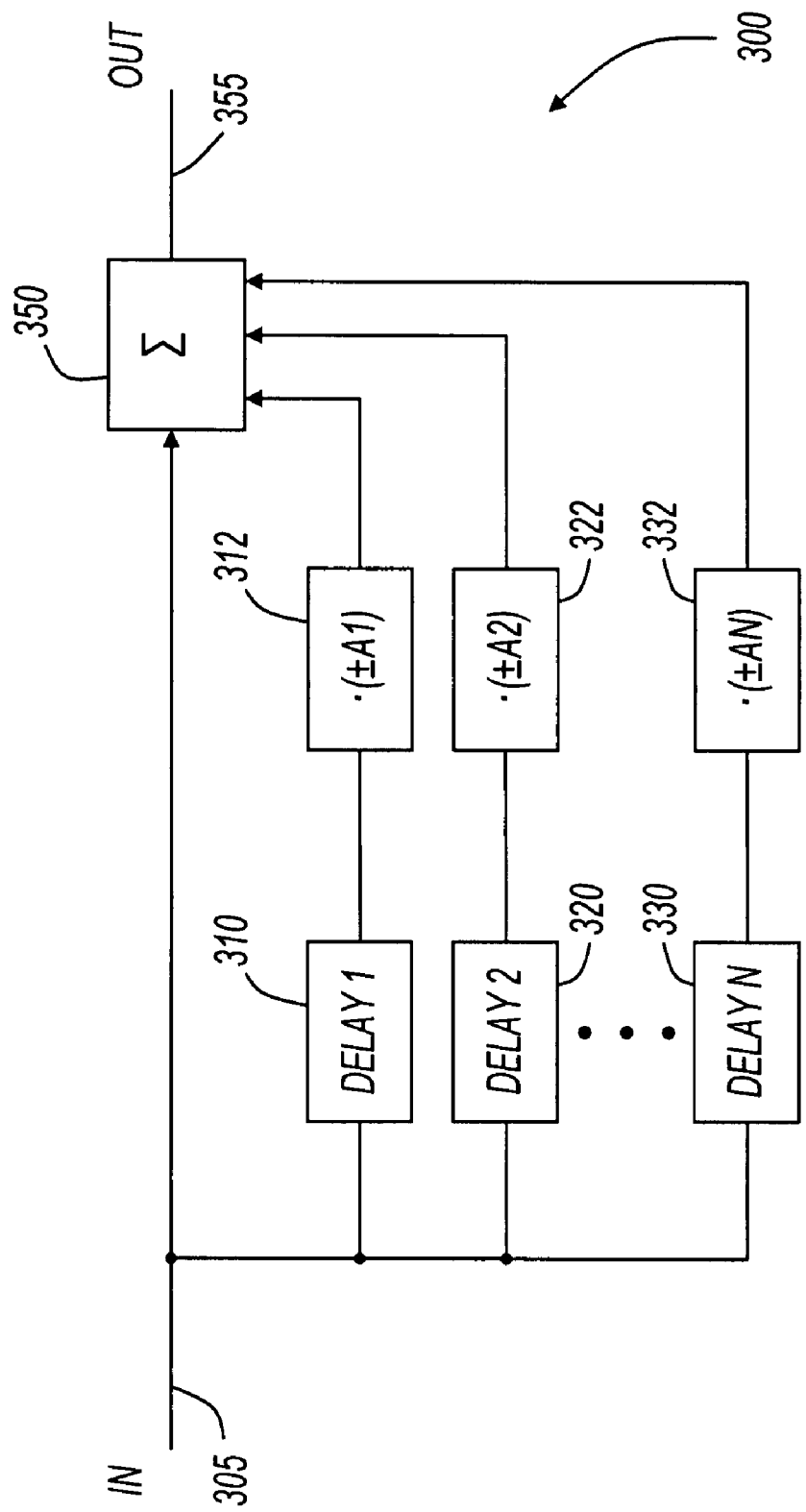
FIG. 3 shows a diagram of a reconfigurable partial response encoder.

FIG. 3 shows a reconfigurable partial response encoder. Reconfigurable partial response encoder 300 receives data on node 305, and transmits data on node 355. Reconfigurable partial response encoder 300 includes delay elements 310, 320, and 330; scaling elements 312, 322, and 332; and summer 350.

In operation, summer 350 sums the data received on node 305 with delayed and scaled data received from scaling elements 312, 322, and 332. In some embodiments, delay elements 310, 320, and 330 are configurable to allow various delays to be introduced to modify spectral characteristics of data signals transmitted on node 355. Further, in some embodiments, the sign and coefficient of scaling elements 312, 322, and 332 are configurable to allow various scalings to be introduced to modify spectral characteristics of data signals transmitted on node 355. Still further, the operating clock rate of reconfigurable partial response encoder 300 may be changed to modify spectral characteristics of data signals transmitted on node 355.

In general, any number of delay elements and scaling elements may be present in reconfigurable partial response encoder 300. For simplicity, the remaining discussion is focused on embodiments that incorporate a single delay element, and a single scaling element of plus or minus one. In these embodiments, summer 350 sums data from two sources: node 305; and a single delay/scaling element set. The data output on node 355 is referred to using the notation:

$$\text{OUT}=1+D^n$$

Where "OUT" is the transmitted symbol, "1" refers to the data received on node 305, "+D" refers to the sign of the scaling coefficient, and "n" refers to the delay value. Using this notation, 1+D refers to a partial response encoder in which the received data is summed with the received data delayed by a single symbol period. Also using this notation, $1-D^2$ refers to a partial response encoder in which the received data is summed with the negative of the received data delayed by two symbol periods; and $1-D^4$ refers to a partial response encoder in which the received data is summed with the negative of the received data delayed by four symbol periods.

Reconfigurable partial response encoders of the form $1+D^n$ are examples of correlative filters that produce a spectrum having a frequency response $A(f)=\sin(2\pi fD)$ with repeating spectral notches. For example, a $1-D^2$ partial response encoder produces a spectrum having spectral notches at integer multiples of one half the symbol rate, and a $1-D^4$ partial response encoder produces a spectrum having spectral notches at integer multiples of one fourth the symbol rate.

Symbols output from partial response encoders of the form $1+D^n$ exhibit three signal levels, in part because they are generated by summing an input symbol with a delayed and scaled input symbol. Data detection of the tri-level signal may incorporate a filter with memory, such as an infinite impulse response (IIR) filter. Various embodiments with memory are described further with reference to FIG. 4. Data detection of the tri-level signal may also be performed without memory by pre-coding data prior to partial response encoding. Various embodiments that include pre-coding are described with reference to FIGS. 5 and 6, below.

Figure 4:
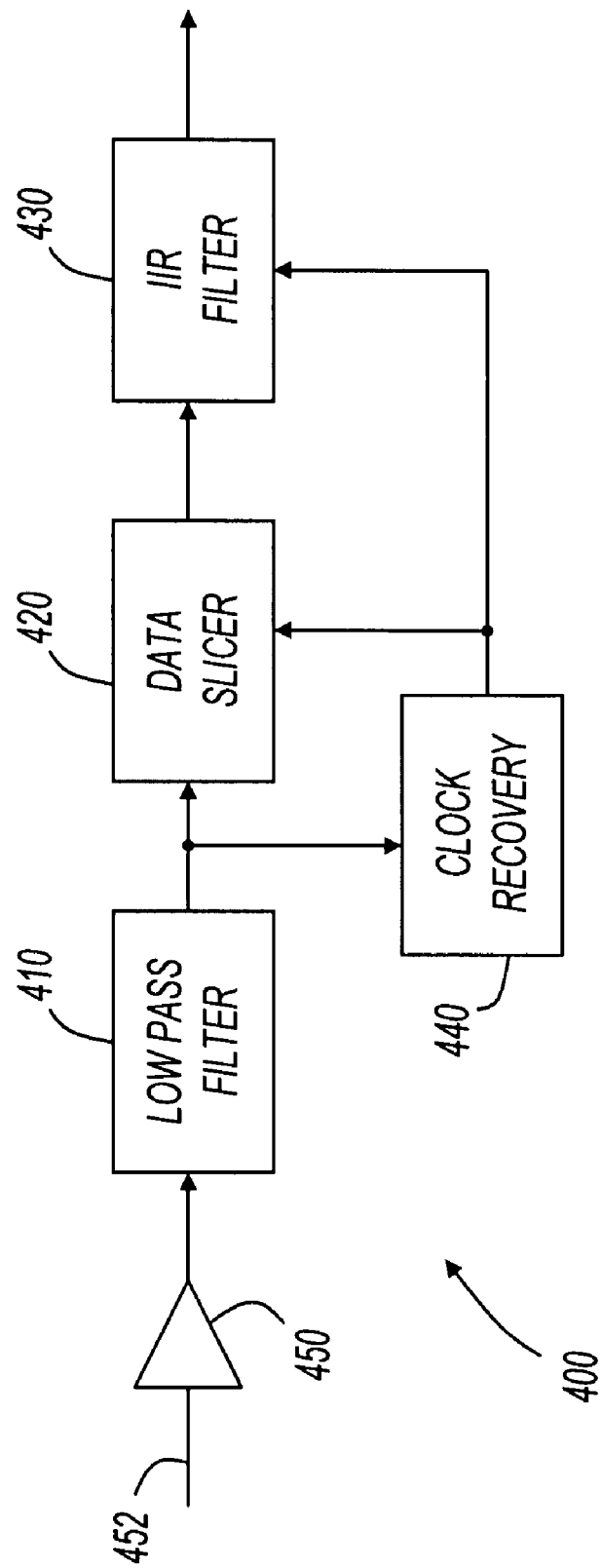
FIG. 4 shows a diagram of a digital data port.

FIG. 4 shows a diagram of a digital data port. Digital data port 400 includes receiver 450, low pass filter 410, data slicer 420, IIR filter 430, and clock recovery circuit 440. For simplicity, FIG. 4 only shows the receiving portion of a digital data port. In some embodiments, digital data port 400 includes a transmitting portion as well as a receiving portion. Digital data port 400 may be used as a digital data port in an electronic system, such as digital data port 144 in system 100 (FIG. 1).

In operation, receiver 450 receives a signal on node 452, and provides the signal to low pass filter 410. Receiver 450 may be any type of receiver suitable to receive the signal. For example, receiver 450 may be a low power linear amplifier. Low pass filter 410 may be any type of low pass filter suitable to process the received signal. In some embodiments, low pass filter 410 exhibits a cut-off frequency suitably placed to pass frequency components that include information in the signal, and to reject frequency components that may include interfering signals. In some embodiments, low pass filter 410 is omitted.

Clock recovery circuit 440 receives the output from low pass filter 410, and recovers a clock signal. In some embodiments, clock recovery circuit 440 may include control loops to recover a clock from the received signal. The present invention is not limited by the particular details of clock recovery circuit 440.

Data slicer 420 receives a signal from low pass filter 410, and a clock signal from clock recovery circuit 440. Data slicer 420 "slices" the signal to recover transmitted symbols by taking samples of the signal. In some embodiments, the received signal includes three signal levels, and data slicer 420 discriminates between these three levels. Data slicer 420 may include multiple digital comparators, an analog-to-digital converter, or any other suitable circuit.

The transmitted symbols recovered by data slicer 420 are processed by IIR filter 430 to decode the partial response encoding provided by an encoder such as reconfigurable partial response encoder 210 (FIG. 2). For example, when symbols are encoded with a $1-D^2$ encoder, IIR filter 430 performs the inverse of $1-D^2$, and when symbols are encoded with a $1-D^4$ encoder, IIR filter 430 performs the inverse of $1-D^4$.

Figure 5:
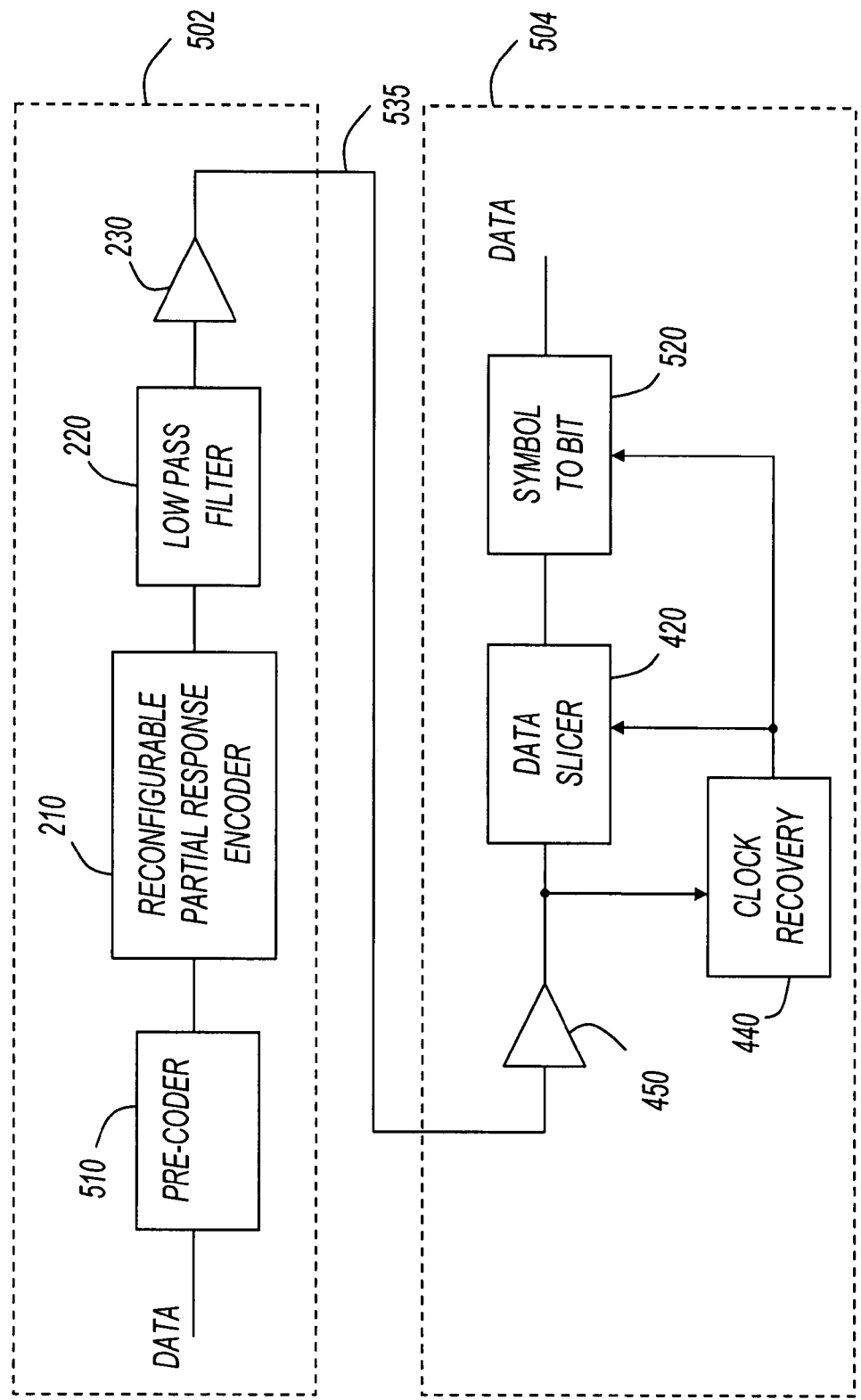
FIGS. 5 and 6 show diagrams of interconnected digital data ports.

FIG. 5 shows a diagram of interconnected digital data ports. Digital data port 502 transmits a digital signal on conductor 535, and digital data port 504 receives the digital signal on conductor 535. Digital data port 502 includes pre-coder 510, reconfigurable partial response encoder 210, low pass filter 220, and line driver 230. Digital data port 504 includes receiver 450, clock recovery circuit 440, data slicer 420, and symbol-to-bit circuit 520.

Digital data port 502 is similar to digital data port 200 (FIG. 2) with the exception of pre-coder 510. Pre-coder 510 codes the input bit data stream to allow the data to be recovered by digital data port 504 without the use of memory. For example, the IIR of FIG. 4 is replaced with symbol-to-bit circuit 520 in FIG. 5. Symbol-to-bit circuit 520 may map the three received signal levels to two levels based on the pre-coding provided by pre-coder 510.

In embodiments represented by FIG. 5, receiver 450 drives data slicer 420 directly without first passing through a low pass filter. In some embodiments, a low pass filter is included as shown in FIG. 4.

Figure 6:
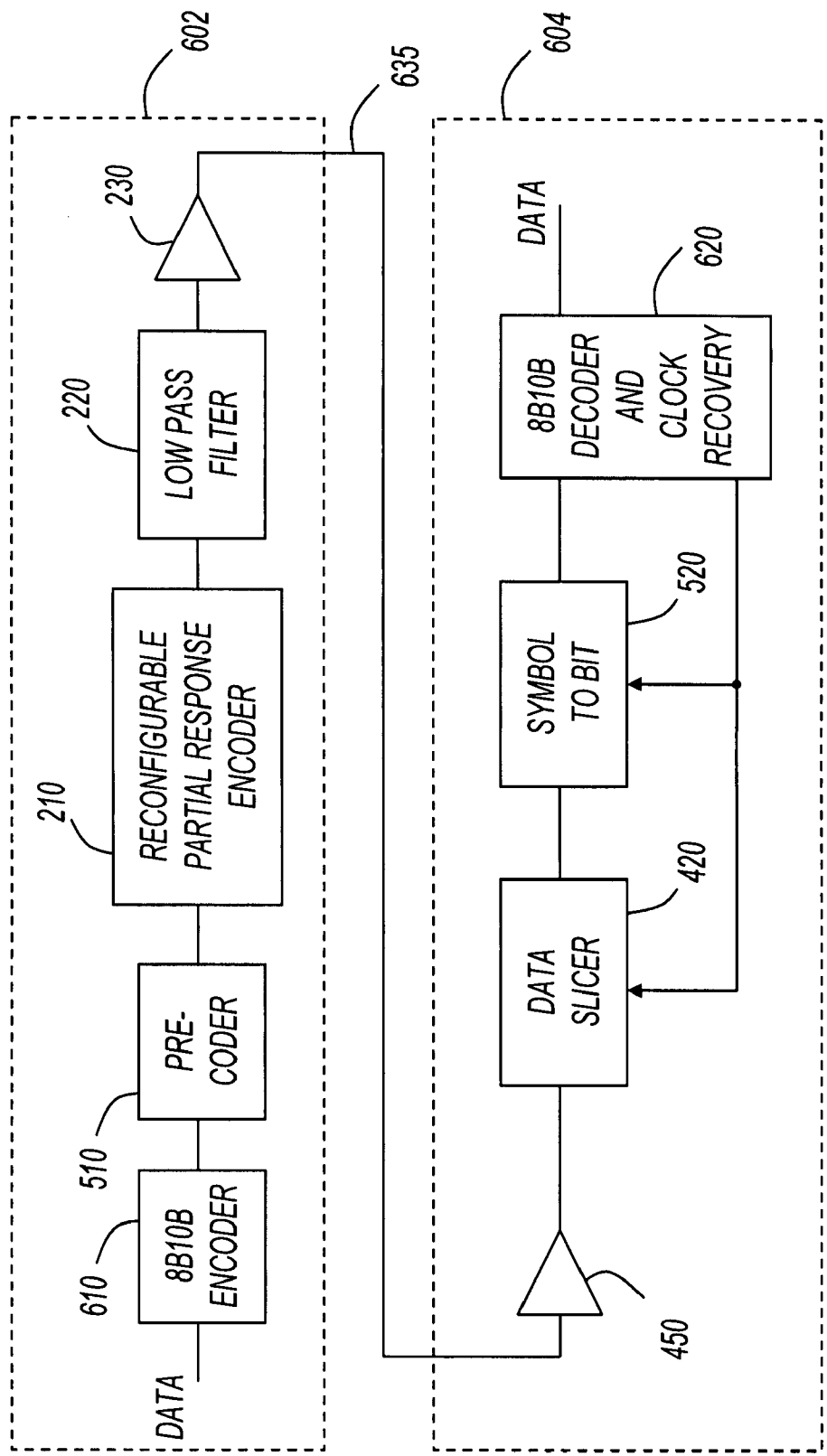

FIG. 6 shows a diagram of interconnected digital data ports. Digital data port 602 transmits a digital signal on conductor 635, and digital data port 604 receives the digital signal on conductor 635. Digital data port 602 includes 8B10B encoder 610, pre-coder 510, reconfigurable partial response encoder 210, low pass filter 220, and line driver 230. Digital data port 604 includes receiver 450, data slicer 420, symbol-to-bit circuit 520, and 8B10B decoder and clock recovery circuit 620.

Digital data port 602 is similar to digital data port 502 (FIG. 5) with the exception of 8B10B encoder 610. 8B10B encoder 610 is an example of a "spectral whitening" encoder that suppresses DC spectral components and spectral spikes. Some embodiments include a spectral whitening encoder other than an 8B10B encoder, and some embodiments omit a spectral whitening encoder.

Digital data port 604 is similar to digital data port 504 with the exception of 8B10B decoder and clock recovery circuit 620. After symbol-to-bit circuit 520 produces bit values from symbols, 8B10B decoder and clock recovery circuit 620 decodes the encoding provided by 8B10B encoder 610, and also recovers a clock signal to provide to data slicer 420 and symbol-to-bit circuit 520.

Figure 7:
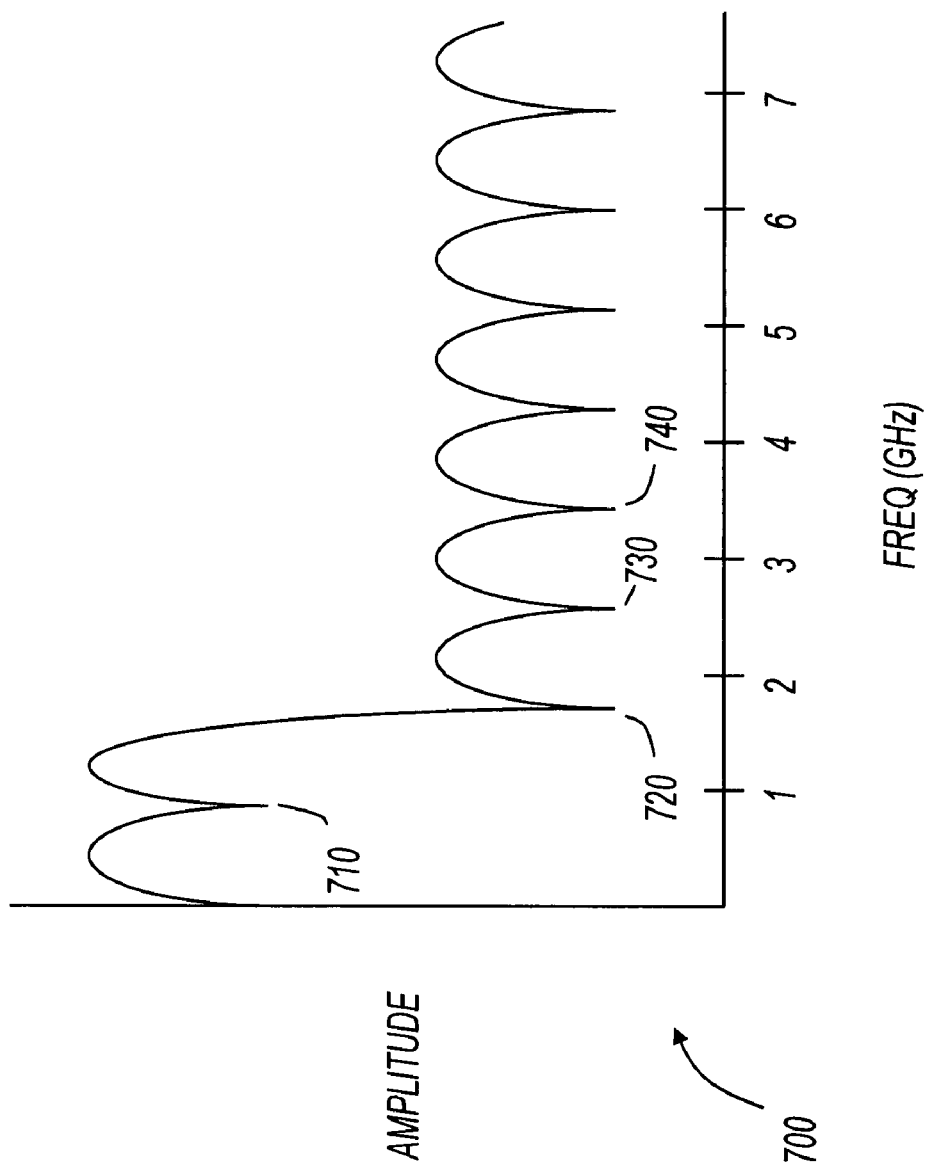
FIG. 7 shows a plot of amplitude versus frequency.

FIG. 7 shows a plot of amplitude versus frequency. Plot 700 shows the spectrum of a transmitted digital signal. For example, plot 700 may correspond to the spectrum of a signal on conductor 135 (FIG. 1), conductor 535 (FIG. 5), or conductor 635 (FIG. 6).

Plot 700 exhibits multiple spectral notches at various frequencies. For example, spectral notches 710, 720, 730, and 740 exist at frequencies of approximately 850 MHz, 1.7 GHz, 2.54 GHz, and 3.4 GHz, respectively. In some embodiments, this spectrum may be generated using a digital data port with a $1-D^4$ partial response encoder operating at 3.4 GHz and a low pass filter to substantially suppress signal energy above about 1.7 GHz. For example, referring to FIG. 6, reconfigurable partial response encoder 210 may be configured as a $1-D^4$ encoder, and low pass filter 220 may substantially suppress signal energy above about 1.7 GHz.

The spectral notches shown in plot 700 may be moved by reconfiguring a partial response encoder. For example, the number of spectral notches may be modified by changing the delay value in the encoder. Further, existing spectral notches may be moved in frequency by modifying the clock rate at which the reconfigurable partial response encoder operates.

Example reconfigurations include, but are not limited to: reducing the clock frequency to bring spectral notch 720 down to 1.5 GHz to reduce interference in the GPS wireless frequency band; changing the clock frequency to modify the spectral location of spectral notch 730 in the vicinity of the 2.4 GHz wireless frequency band; or modifying the delay in a $1+D^n$ partial response encoder to modify the number of spectral notches.

Plot 700 shows a particular number of spectral notches at various frequencies, and the above discussion of plot 700 refers to particular wireless frequency bands. This is not a limitation of the present invention. For example, any number of spectral notches may be created, and their spectral locations may be modified to reduce interference in any frequency band of interest. In some embodiments, spectral notches are created to reduce interference to circuits other than wireless interface circuits.

Figure 8:
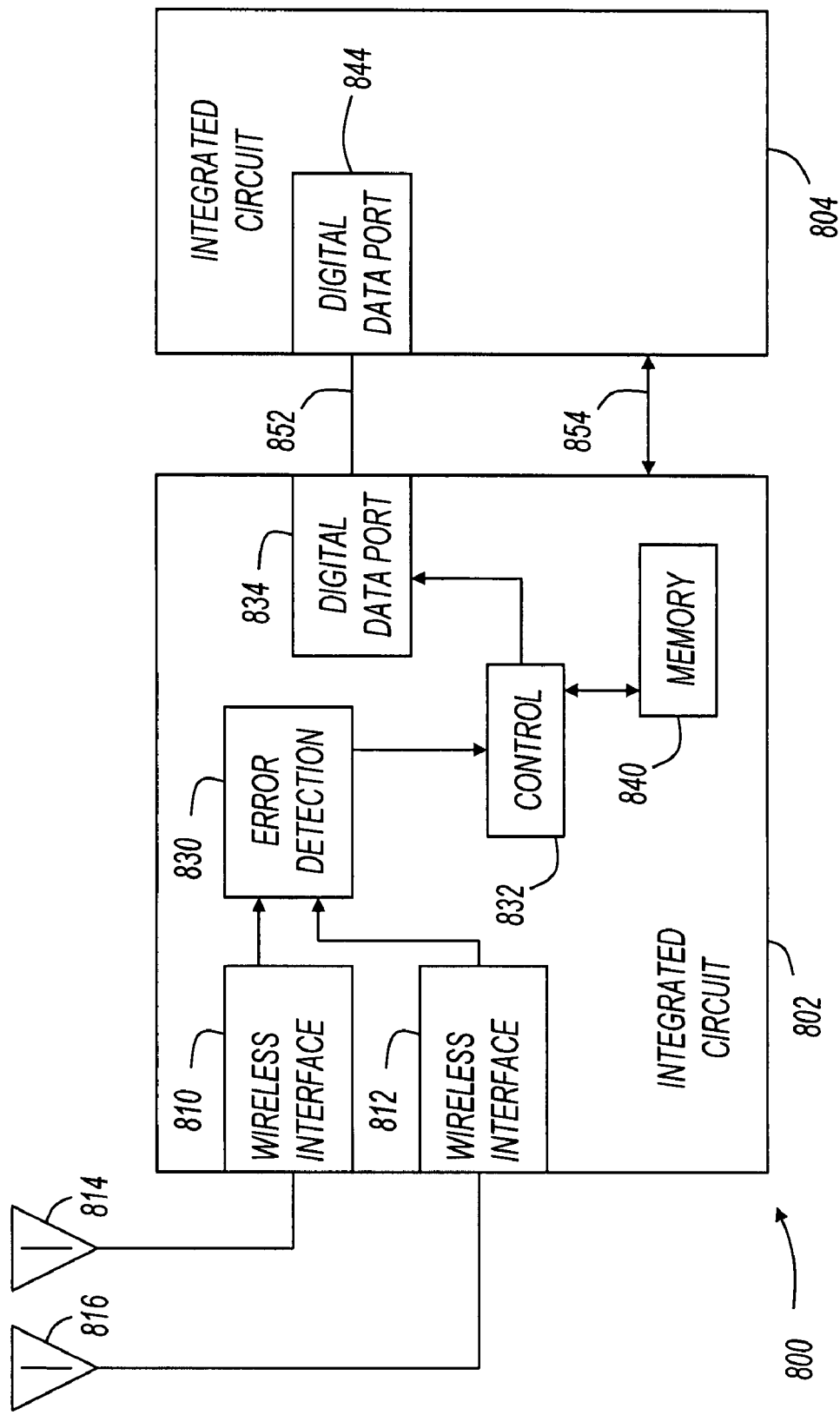
FIG. 8 shows a block diagram of an electronic system.

FIG. 8 shows a block diagram of an electronic system. System 800 includes integrated circuits 802 and 804, and antennae 814 and 816. Integrated circuit 802 includes wireless interfaces 810 and 812, error detection circuit 830, control circuit 832, memory 840, and digital data port 834; and integrated circuit 804 is shown including digital data port 844. Antennae 814 and 816 may be either a directional antenna or an omni-directional antenna. For example, in some embodiments, antenna 814 may be an omni-directional antenna such as a dipole antenna, or a quarter wave antenna. Also for example, in some embodiments, antenna 816 may be a directional antenna such as a parabolic dish antenna or a Yagi antenna.

In operation, system 800 may include the ability to communicate using digital signals and RF signals. For example, wireless interfaces 810 and 812 are coupled to antennae 814 and 816 to transmit and receive RF signals at various frequencies. Also for example, digital data ports 834 and 844 are coupled by conductor 835 to communicate using digital signals.

In some embodiments, analog signals transmitted or received by antennae 814 or 816 may correspond to voice signals, data signals, or any combination thereof. For example, either or both of wireless interfaces 810 and 812 may be a wireless local area network interface, cellular phone interface, global positioning system (GPS) interface, or the like.

In some embodiments, digital data ports 834 and 844 communicate using digital signals transmitted at various frequencies, and over varying distances. For example, digital data ports 834 and 844 may communicate at data rates of a few megahertz (MHz), a few hundred MHz, a few gigahertz (GHz), any rate in between, or any rate higher. Further, integrated circuits 802 and 804 may be closely spaced and conductor 835 may be short, or integrated circuits 802 and 804 may be spaced far apart and conductor 835 may be long.

Integrated circuit 802 also includes error detection circuit 830, control block 832, and memory 840. The combination of error detection circuit 830 and control block 832 form an adaptive circuit to measure errors in data received by wireless interface circuits and modify characteristics of a partial response encoder to reduce the measured errors.

Error detection circuit 830 may detect errors in received data from various wireless interfaces. For example, error detection circuit 830 may be a bit error rate (BER) detector or calculator, or error detection circuit 830 may track packet errors, packet retries, or the like. In general, error detection circuit 830 may be any circuit suitable to provide control block 832 with an indication of the robustness of wireless links utilized by the various wireless interfaces.

Control block 832 may receive error information from error detection circuit 830, and configure portions of digital data port 834. For example, in some embodiments, control block 832 may configure or reconfigure a configurable partial response encoder within digital data port 834. In some embodiments, control block 832 may modify a clock rate or a delay value or a scaling coefficient of a configurable partial response encoder to modify spectral characteristics of a transmitted signal.

Control block 832 may be any type of circuit suitable to configure or reconfigure a reconfigurable partial response encoder. For example, control block 832 may be a processor, such as a microprocessor, digital signal processor, microcontroller, or the like. Also for example, control block 832 may be dedicated digital hardware such as a state machine.

As shown in FIG. 8, control block 832 is included within integrated circuit 802. In some embodiments, control block 832 is external to integrated circuit 802. For example, control block 832 may be a processor outside of, and coupled to, integrated circuit 802.

Memory 840 represents an article that includes a machine readable medium. For example, memory 840 represents any one or more of the following: a hard disk, a floppy disk, random access memory (RAM), dynamic random access memory (DRAM), static random access memory (SRAM), read only memory (ROM), flash memory, CDROM, or any other type of article that includes a medium readable by a machine such as control block 832. In some embodiments, memory 840 can store instructions for performing the execution of the various method embodiments of the present invention.

In operation of some embodiments, control block 832 reads instructions and data from memory 840 and performs actions in response thereto. For example, various method embodiments of the present invention may be performed by control block 832 while reading instructions from memory 840.

In some embodiments, memory 840 is internal to integrated circuit 802 as shown in FIG. 8, and in other embodiments, 840 is external to integrated circuit 802. In some embodiments, memory 840 is omitted.

Integrated circuit 804 is shown including digital data port 844. In some embodiments, integrated circuit 804 includes more than one digital data port. For example, in some embodiments, each of integrated circuits 802 and 804 include multiple digital data ports coupled by conductors 835. Further, integrated circuit 804 may include functional blocks, wireless interfaces, or any other suitable circuit.

Integrated circuits 802 and 804 are also coupled by conductor 854. Conductor 854 is shown in FIG. 8 as a single conductor, but this is not a limitation of the present invention. For example, conductor 854 may be a communications interface that includes any number of conductors; examples include, but are not limited to, a serial interface, a parallel interface, a processor bus, a system bus, or the like. In some embodiments, conductor 854 may be used to coordinate the configurations of digital data ports in integrated circuits 802 and 804. For example, if an operating clock rate, delay, or scaling of a reconfigurable partial response encoder is modified in integrated circuit 802, conductor 854 may be utilized to coordinate the modification of the same configurable parameters in integrated circuit 804.

Systems, digital data ports, control blocks, reconfigurable partial response encoders, and other embodiments of the present invention can be implemented in many ways. In some embodiments, they are implemented in integrated circuits. In some embodiments, design descriptions of the various embodiments of the present invention are included in libraries that enable designers to include them in custom or semi-custom designs. For example, any of the disclosed embodiments can be implemented in a synthesizable hardware design language, such as VHDL or Verilog, and distributed to designers for inclusion in standard cell designs, gate arrays, or the like. Likewise, any embodiment of the present invention can also be represented as a hard macro targeted to a specific manufacturing process. For example, any of the digital data port embodiments described herein may be represented as polygons assigned to layers of an integrated circuit.

Figure 9:
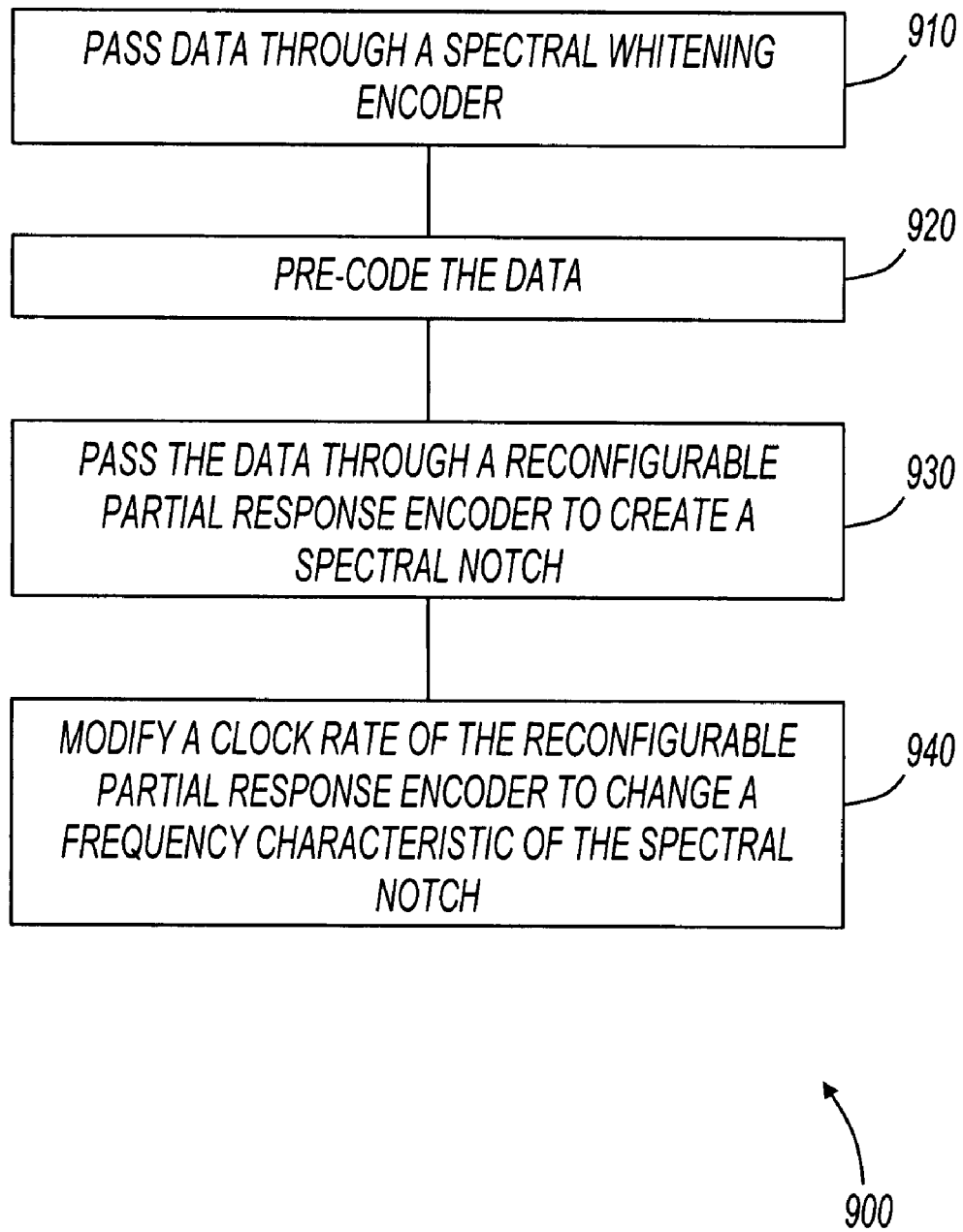
FIGS. 9 and 10 show flowcharts in accordance with various embodiments of the present invention.

FIG. 9 shows a flowchart in accordance with various embodiments of the present invention. In some embodiments, method 900, or portions thereof, is performed by an electronic system, an integrated circuit, or digital data port, embodiments of which are shown in the various figures. In other embodiments, all or a portion of method 900 is performed by a control circuit or processor. Method 900 is not limited by the particular type of apparatus or software element performing the method. The various actions in method 900 may be performed in the order presented, or may be performed in a different order. Further, in some embodiments, some actions listed in FIG. 9 are omitted from method 900.

Method 900 is shown beginning with block 910 where data is passed through a spectral whitening encoder. Examples of spectral whitening encoders include 8B10B encoders described with reference to previous figures. At 920, the data is pre-coded. In some embodiments, this corresponds to passing data through a pre-coder such as pre-coder 510 (FIGS. 5, 6).

At 930, the data is passed through a reconfigurable partial response encoder to create a spectral notch. In some embodiments, this corresponds to passing the data through a reconfigurable partial response encoder of the form $1+D^n$. Spectral notches may be created in or near one or more wireless frequency bands to reduce potential RF interference.

At 940, a clock rate of the reconfigurable partial response encoder is modified to change a frequency characteristic of the spectral notch. For example, the clock rate may be increased to increase the frequency of the spectral notch, or the clock rate may be decreased to decrease the frequency of the spectral notch.

Figure 10:
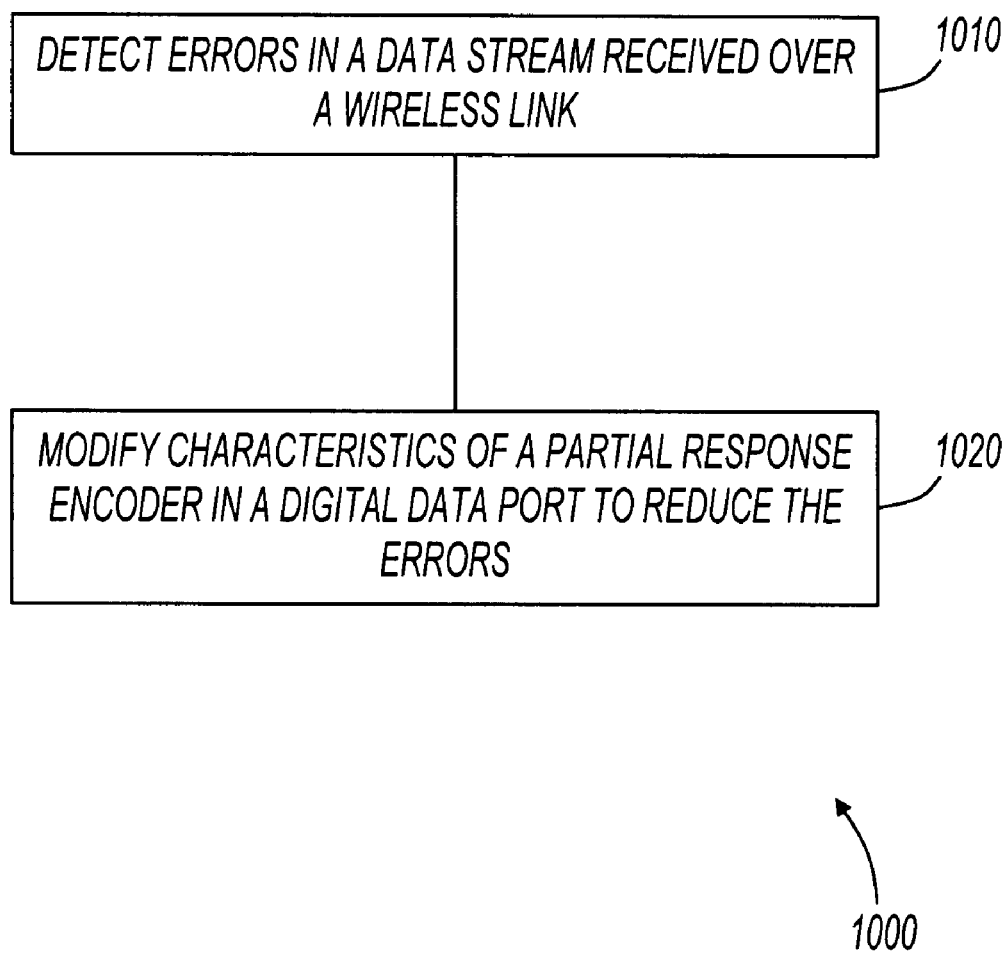

FIG. 10 shows a flowchart in accordance with various embodiments of the present invention. In some embodiments, method 1000, or portions thereof, is performed by a processor, embodiments of which are shown in the various figures. In other embodiments, method 1000 is performed by a control circuit, an integrated circuit, or an electronic system. Method 1000 is not limited by the particular type of apparatus or software element performing the method. The various actions in method 1000 may be performed in the order presented, or may be performed in a different order. Further, in some embodiments, some actions listed in FIG. 10 are omitted from method 1000.

Method 1000 is shown beginning with block 1010 where errors are detected in a data stream received over a wireless link. In some embodiments, the actions of block 1010 correspond to the operation of error detection circuit 830 (FIG. 8). In some embodiments, the actions of block 1010 are performed in software by a processor.

At 1020, characteristics of a partial response encoder in a digital data port are modified to reduce the errors detected in block 1010. Modifiable characteristics may include clock rate, delay values, scaling coefficient values, or any other configurable portion of a partial response encoder. Actions of block 1020 may correspond to a processor or control block such as control block 832 (FIG. 8) configuring a portion of a digital data port such as digital data port 834 (FIG. 8).

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method comprising:
   passing data through a reconfigurable partial response encoder to create a spectral notch at a frequency other than DC;
   transmitting data output from the reconfigurable partial response encoder at baseband, the data output from the reconfigurable partial response encoder exhibiting the spectral notch; and
   modifying a clock frequency of the reconfigurable partial response encoder to tune the spectral notch.

2. The method of claim 1 further comprising pre-coding the data prior to passing through the reconfigurable partial response encoder.

3. The method of claim 2 further comprising passing the data through a spectral whitening encoder.

4. A method comprising:
   detecting errors in a data stream received over a wireless link; and
   modifying characteristics of a partial response encoder in a digital data port to reduce the errors, wherein modifying characteristics comprises modifying a clock frequency at which the partial response encoder operates to modify a spectral location of a spectral notch exhibited by baseband data transmitted by the digital data port.

5. An apparatus comprising:
   a digital data port to transmit baseband digital data, the digital data port having a reconfigurable partial response encoder to encode the baseband digital data such that when transmitted, the baseband digital data exhibits a spectral notch in the region of a wireless frequency band;
   a wireless interface that operates in the wireless frequency band; and
   a circuit to modify a clock frequency of the reconfigurable partial response encoder to move the spectral notch in frequency relative to the wireless frequency band.

6. The apparatus of claim 5 wherein the spectral notch is between about 800 MHz and about 900 MHz.

7. The apparatus of claim 5 wherein the digital data port further comprises a low pass filter to reduce spectral energy in wireless frequency bands above the spectral notch.

8. The apparatus of claim 5 wherein the reconfigurable partial response encoder implements $1-D^4$.

9. The apparatus of claim 8 wherein the reconfigurable partial response encoder operates at a clock frequency of approximately 3.4 GHz.

10. The apparatus of claim 5 wherein the reconfigurable partial response encoder implements $1-D^2$.

11. The apparatus of claim 5 wherein the reconfigurable partial response encoder implements $1+D$.

12. The apparatus of claim 5 wherein the wireless frequency band corresponds to global positioning system (GPS) signals.

13. The apparatus of claim 5 wherein the wireless frequency band corresponds to cellular phone signals.

14. The apparatus of claim 5 wherein the wireless frequency band corresponds to wireless local area network (WLAN) signals.

15. An apparatus comprising:
   a wireless interface circuit;
   a digital interface circuit that includes a partial response encoder to create a spectral notch at a non-zero frequency in transmitted baseband digital data; and
   an adaptive circuit to measure errors in data received by the wireless interface circuit and to modify a clock frequency of the partial response encoder to tune the spectral notch.

16. The apparatus of claim 15 wherein the spectral notch is near in frequency to a frequency of operation of the wireless interface circuit.

17. The apparatus of claim 15 wherein the partial response encoder implements $1-D^4$.

18. The apparatus of claim 15 wherein the digital interface circuit further comprises a pre-coder to obviate a need for memory in a receiver.

19. The apparatus of claim 15 wherein the wireless interface circuit comprises a global positioning system (GPS) receiver.

20. The apparatus of claim 15 wherein the wireless interface circuit comprises a cellular phone interface.

21. The apparatus of claim 15 wherein the wireless interface circuit comprises a wireless local area network interface.

22. An electronic system comprising:
   a first integrated circuit including a wireless interface circuit and a digital data port to transmit baseband digital data, the digital data port including a partial response encoder to mitigate interference to the wireless interface circuit, wherein the partial response encoder encodes the baseband digital data such that when transmitted, the baseband digital data exhibits a spectral notch at a non-zero frequency, the first integrated circuit comprising an adaptive circuit to measure errors in data received by the wireless interface circuit and to modify a clock frequency of the partial response encoder to tune the spectral notch;

a second integrated circuit in digital communication with the digital data port of the first integrated circuit; and an omni-directional antenna coupled to the wireless interface circuit of the first integrated circuit.

23. The electronic system of claim 22 wherein the wireless interface circuit comprises an apparatus to operate between about 800 MHz and about 900 MHz.

24. The electronic system of claim 22 wherein the wireless interface circuit comprises an apparatus to operate between about 2.4 GHz and about 2.5 GHz.

25. The electronic system of claim 22 wherein the partial response encoder includes a filter to implement $1-D^4$.

* * * * *